(12) United States Patent
Kraynak

(10) Patent No.: US 6,724,367 B2
(45) Date of Patent: Apr. 20, 2004

(54) MANUALLY-CONTROLLED DEVICE FOR MOVING A CURSOR

(75) Inventor: Robert G. Kraynak, Seven Hills, OH (US)

(73) Assignee: General Motors Corporation, Detroit, MI (US)

(*) Notice: Subject to any disclaimer, the term of this patent is extended or adjusted under 35 U.S.C. 154(b) by 221 days.

(21) Appl. No.: 09/997,051

(22) Filed: Nov. 20, 2001

(65) Prior Publication Data

US 2003/0095100 A1 May 22, 2003

(51) Int. Cl.$^7$ .................................................. G09G 5/08
(52) U.S. Cl. ........................ 345/157; 345/184; 345/156; 340/995.16
(58) Field of Search ................................. 345/156, 157, 345/168, 169, 163, 164, 165, 166, 167, 184; 74/471 XY, 471 R; 340/980, 990, 995.1, 995.16

(56) References Cited

U.S. PATENT DOCUMENTS

| | | | | |
|---|---|---|---|---|
| 4,712,101 A | * | 12/1987 | Culver | 345/157 |
| 4,788,537 A | * | 11/1988 | Potiker | 345/165 |
| 4,823,634 A | * | 4/1989 | Culver | 74/471 XY |
| 4,928,093 A | * | 5/1990 | Rahman | 345/157 |
| 5,021,771 A | * | 6/1991 | Lachman | 345/164 |
| 5,086,510 A | * | 2/1992 | Guenther et al. | 455/575.9 |
| 5,126,723 A | * | 6/1992 | Long et al. | 345/157 |
| 5,235,868 A | * | 8/1993 | Culver | 74/471 XY |
| 5,341,154 A | * | 8/1994 | Bird | 345/167 |
| 5,635,926 A | * | 6/1997 | Li | 341/20 |

* cited by examiner

Primary Examiner—Xiao Wu
(74) Attorney, Agent, or Firm—Christopher DeVries

(57) ABSTRACT

An apparatus for controlling the position of a cursor on the display of a computer comprising a first cylindrical member and a second cylindrical member concentrically engaging the first cylindrical member and coupled thereon for both rotational relative movement and translational relative movement. A detector is provided for sensing this relative movement and providing signals representative thereof to a computer for controlling the position of a cursor on the display. This apparatus is especially suitable for use on a vehicle carrying an onboard computer and could, for example, be mounted on the steering post of the vehicle.

12 Claims, 3 Drawing Sheets

MANUALLY-CONTROLLED DEVICE FOR MOVING A CURSOR

TECHNICAL FIELD

This invention relates generally to a manually-controlled device for generating multi-dimensional data for input to a computer and, more particularly, to a device for positioning a cursor on the display of an onboard computer deployed in an automobile.

BACKGROUND OF THE INVENTION

A computer mouse is a well-known device used in conjunction with a computer to control multi-directional movement of a cursor displayed on the computer's monitor or display. Centrally located within the bottom surface of the mouse is a hole through which extends a portion of the underside of a rubber-surfaced steel ball. A mouse pad is generally provided which is typically a closed-cell foam-rubber pad covered with a suitable fabric. Low friction pads on the bottom surface of the mouse slide easily over the fabric, but instead of skidding, the ball rolls as the mouse is moved.

Interior to the mouse are rollers or wheels that contact the ball and convert its rotation into electrical signals representing orthogonal components of the mouse's motion. These signals are coupled to the computer wherein software responds to the signals to alter the x and y coordinates of the cursor's existing position on the display in accordance with the mouse's movement. The user moves the mouse as necessary to position the cursor at a desired location or position.

The mouse typically carries one or more buttons or switches that are operated by the person using the mouse. Activation of these switches provides signals to the computer directing it to perform a specific function often related to the location or position of the cursor on the screen. That is, after the cursor has been positioned at a desired location on the display, one or more of the buttons/switches can be activated, thus providing an instruction to the computer to take some action, the nature of which is defined by the computer's software. It is not uncommon that the mouse carries a first switch for providing a signal to the computer to perform some function associated with the position of the cursor and a second switch for instructing the computer to perform a task that is not associated with the location of the cursor.

In recent years, there has been an increase in the number of applications requiring the deployment of a computer and an associated monitor or display within a vehicle (e.g., an automobile, truck, etc.). Generally, the vehicle's driver operates the onboard computer. Since the conventional mouse is configured for horizontal movement across the mouse pad, it should be appreciated that this traditional approach is not suitable for a vehicular or automobile environment.

One alternative to the traditional mouse is a device called a trackball. A trackball serves the same function as a mouse relative to the computer; however, a trackball is essentially a stationary device equipped with a ball mounted for full rotational movement within a mounting base. A portion of the ball is exposed to permit the ball to be rotated within its mounting by the user's thumb, fingers or palm. Unfortunately, as was the case with the mouse, the trackball likewise does not lend itself to use by the driver of a vehicle since, at the very least, to do so would require the driver to remove at least one hand from the vicinity of the steering wheel.

In view of the foregoing, it should be appreciated that it would be desirable to provide a simple, compact apparatus for controlling the movement of a cursor on a display or monitor of an onboard, vehicular computer that is easily accessible and operable by the driver of the vehicle. Additional desirable features will become apparent to one skilled in the art from the foregoing background of the invention and following detailed description of a preferred exemplary embodiment and appended claims.

SUMMARY OF THE INVENTION

In accordance with the teachings of the present invention, there is provided an apparatus for controlling the position of a cursor on a display of a computer, the apparatus including a first member and a second member concentrically engaging the first member and coupled thereto for relative movement thereon of a first type and a second type. A detector is coupled to sense the first and second types of relative movement between the first and second members and generates first and second signals related to the first and second types of movement, respectively.

BRIEF DESCRIPTION OF THE DRAWINGS

The present invention will hereinafter be described in conjunction with the appended drawings, wherein like numerals denote like elements, and.

DESCRIPTION OF THE PREFERRED EMBODIMENT

The following detailed description of a preferred embodiment of the invention is mainly exemplary in nature and not intended to limit the invention or the application or use of the invention.

Figure 1:
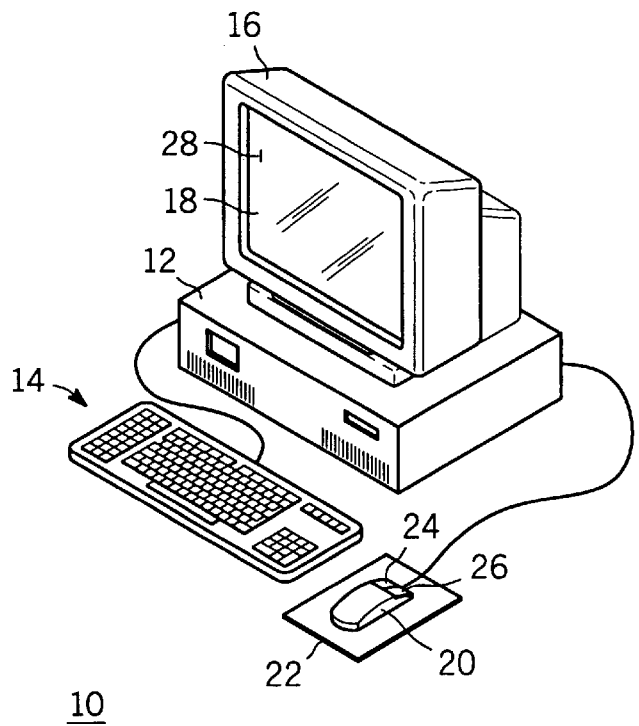
FIG. 1 is a graphical representation of a traditional computer system.

FIG. 1 is a graphical representation of a conventional personal computer system 10. It includes computer 12, keyboard 14, and monitor 16 having a display 18. The system further includes a mouse 20 which is maneuvered on mouse pad 22 in order to move a cursor 28 on monitor display 18. As described above, a ball (not shown) housed within the body of mouse 20 is caused to roll over the surface of mouse pad 22. Sensors within mouse 20 convert the rotation of the ball into orthogonal components of the mouse's motion. These positioning signals are supplied to computer 12 where software responsive to the signal alters the x and y coordinates of cursor 28 appearing on monitor display screen 18. Mouse 20 is also provided with first and second buttons or switches 24 and 26 which, when activated, direct computer 12 to perform a specific function that may be related to the location or position of cursor 28.

Figure 2:
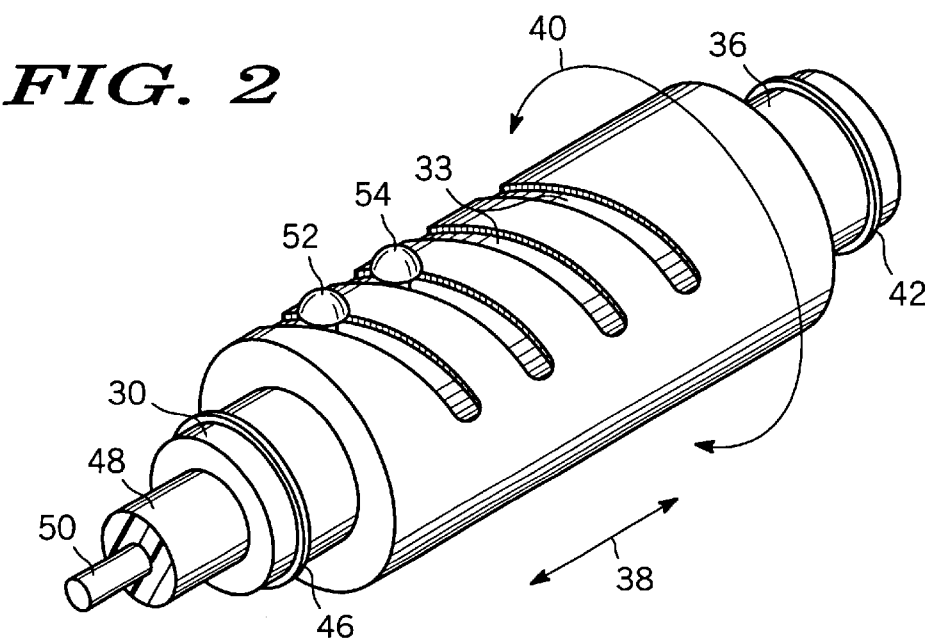
FIG. 2 is an isometric view of the inventive cursor control device.
Figure 3:
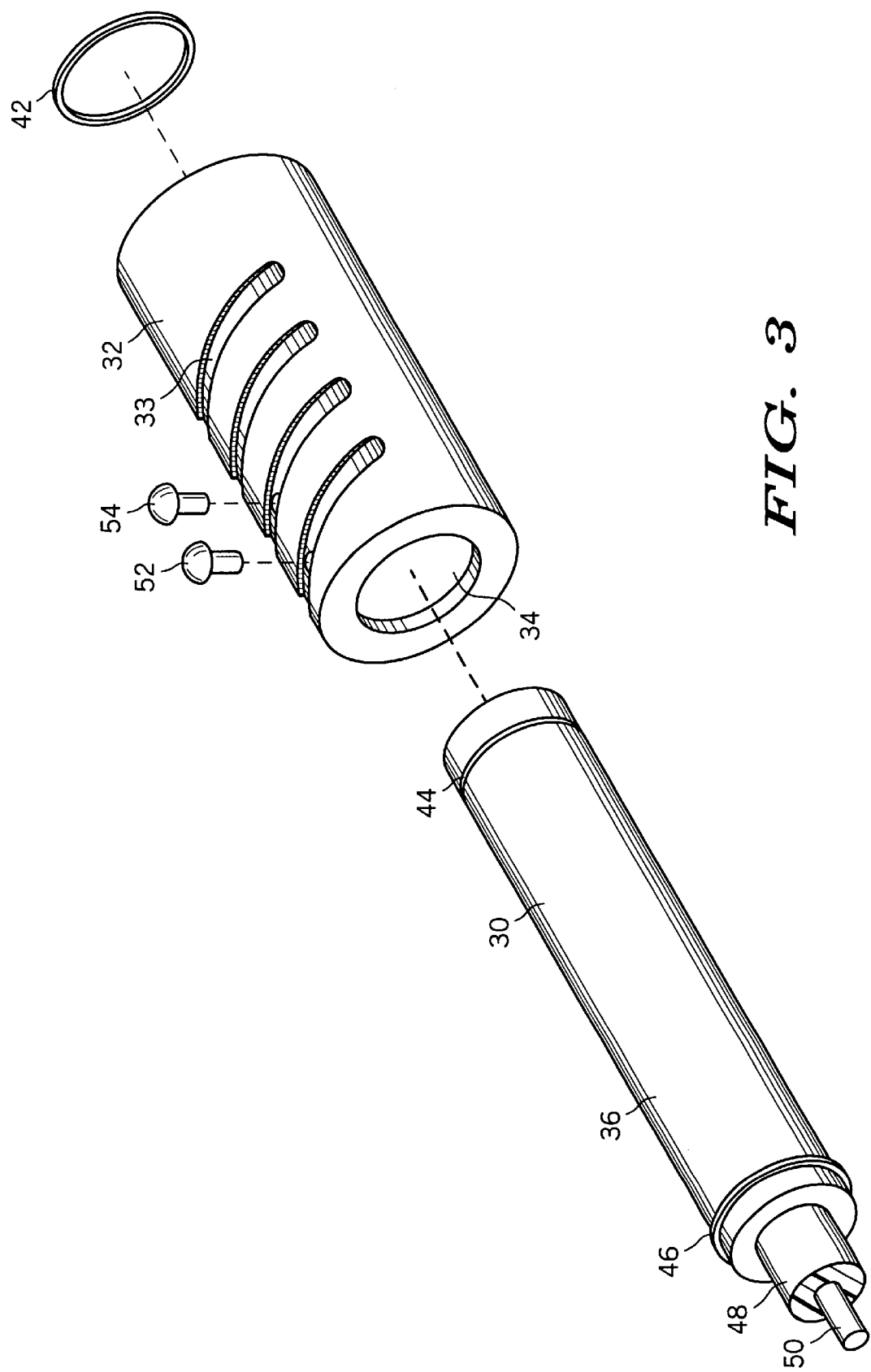
FIG. 3 is an exploded view of the inventive cursor control device shown in FIG. 2.

FIG. 2 is an isometric view of an apparatus for controlling the position of a cursor on the display screen of a computer in accordance with the teachings of the present invention, and FIG. 3 is an exploded view of the apparatus shown in FIG. 2. Referring to FIG. 2 and FIG. 3, it can be seen that the inventive cursor control device includes a first mouse pad member 30 (preferably cylindrical) having a mouse pad surface 36 and a second gripping member 32 (preferably cylindrical) having a central opening 34 therethrough and including a plurality of grooves 33 to facilitate gripping as, for example, when the driver is wearing gloves. Member 30 functions as a mouse pad having a pad surface 36 and is received through aperture 34 such that gripping member 32 is capable of translational relative movement with respect to surface 36 as is indicated by arrow 38 and rotational relative movement with respect to surface 36 as is indicated by arrow 40. The translational movement of gripping member 32 is limited near the right end of mouse pad 30 by snap ring 42 that resides in groove 44. Translational movement of member 32 to the left is similarly limited by snap ring 46. A mounting member or stem 48 is attached to member 30 and may be used to position or couple members 30 and 32 to a desired location such as the steering column or post of a vehicle (for example, an automobile). As can be seen, a cable 50 is received within stem 48 and is employed to convey signals from the switches coupled to members 30 and 32 to a computer as will be discussed hereinbelow. It should be appreciated, however, that if desired, wireless transmission between the inventive cursor positioning apparatus shown in FIG. 2 is well within the state of the art. Furthermore, while mouse pad 30 and gripping member 32 have been shown as generally or substantially cylindrical, it should be clear that they could take any convenient shape which would provide for the desired relative translational and rotational movement.

As stated previously, the mouse typically carries one or more buttons or switches that can be operated by the person using the mouse. Such switches are shown at 52 and 54 in FIG. 2 and FIG. 3. Activation of these switches provides signals via cable 50 to the computer, thus directing it to perform a specific function that may or may not be related to the location or position of the cursor.

Figure 4:
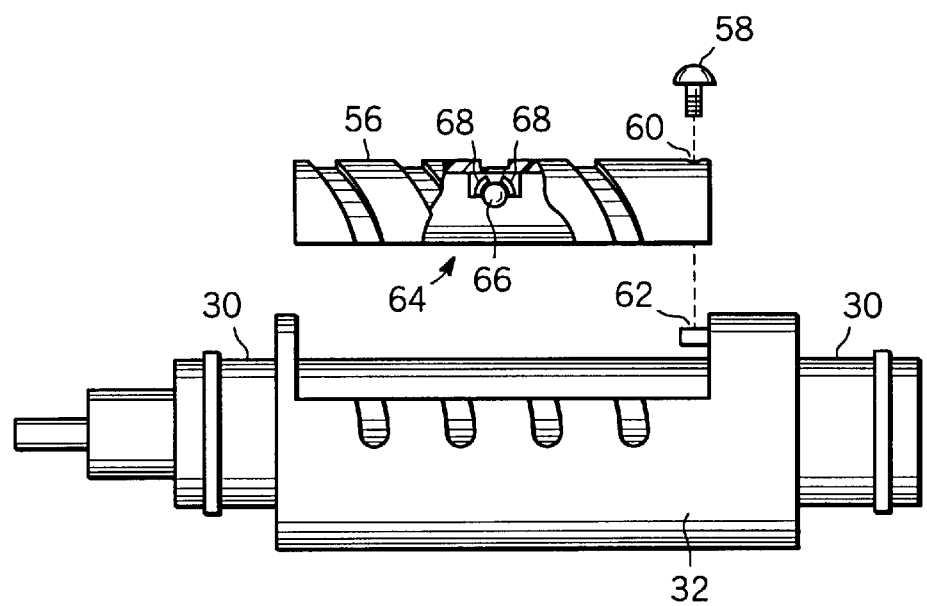
FIG. 4 illustrates a portion of the inventive cursor-positioning device shown in FIG. 2 showing a snap-on ball assembly.

As described above, traditional manual devices for positioning a cursor on a display generally include a detector which might include a ball and rollers or wheels that contact the ball and convert its rotation into electrical signals representing orthogonal components of the mouse's motion. These signals are then supplied to the computer where software resident therein responds to the signals to alter the x and y coordinates of the cursor's existing position on the display in accordance with the mouse's movement. Referring now to FIG. 4, gripping member 32 is provided with a snap-on portion 56 which may be secured to member 32 by, for example, externally threaded member 58 which passes through aperture 60 on snap-on portion 56 and threadably engages an internally threaded aperture 62 in member 32. A detector assembly shown generally at 64 includes a ball 66 and sensors 68. Sensors 68 are coupled to cable 50 in order to provide the above-mentioned orthogonal signals to the computer.

Figure 5:
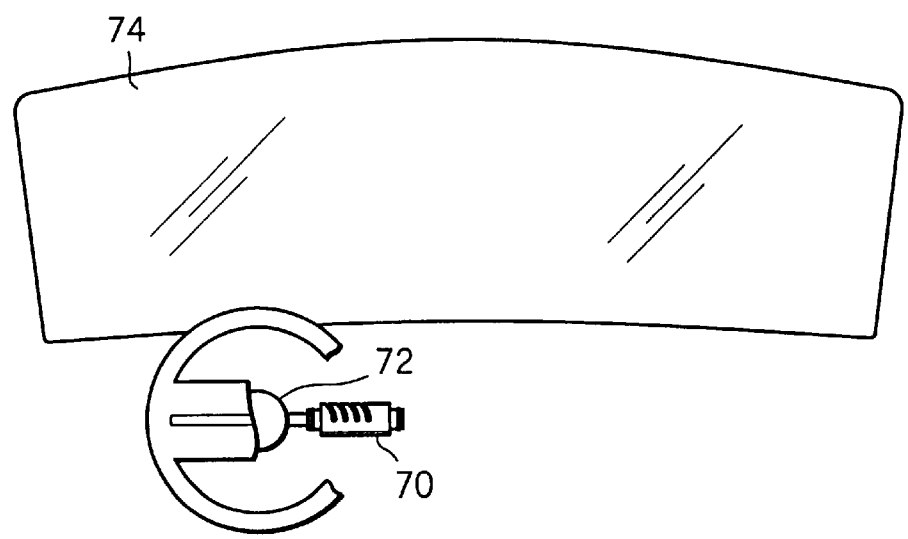
FIG. 5 is a plan view illustrating the deployment of the inventive cursor control device on the steering column of an automobile.

The operation of the inventive apparatus for controlling the position of a cursor on a display will now be more fully described. Referring to FIG. 5, it can be seen that the inventive cursor control apparatus 70 can be conveniently mounted on the steering post 72 of a vehicle such as an automobile. The onboard computer (not shown) may include a standard monitor/display or, if desired, could include a reconfigurable head-up display incorporated into windshield 74 of the vehicle.

To alter the position of a cursor on the display, the operator manipulates rotatable gripping member 32, both translationally and rotationally, on member 36 such that ball 66 which is in contact with surface 36 rolls thereover. The rolling of ball 66 on mouse pad surface 36 is sensed by sensors 68 which convert movement of the ball into first and second orthogonal signals which are then sent to the onboard computer. For example, translational movement of member 32 on member 30 may result in movement of a cursor along an x or horizontal axis. Rotational movement of member 32 on member 30, however, may result in movement of the cursor along a y-axis or vertically. Obviously, in practice, movement will be a combination of lateral and rotational movement; however, sensors 68 will convert such movement into signals representing orthogonal components that are then utilized by the computer software to alter the position of the cursor.

From the foregoing description, it should be appreciated that an apparatus for manually controlling the movement of a cursor on a display has been provided which is particularly suitable for use in a vehicular or automotive environment. While the preferred exemplary embodiment has been presented in the foregoing detailed description, it should be appreciated that a vast number of variations in the embodiments exist. It should also be appreciated that this preferred embodiment is only an example and is not intended to limit the scope, applicability, or configuration of the invention in any way. Rather, the foregoing detailed description provides those skilled in the art with a convenient roadmap for implementing a preferred exemplary embodiment of the invention. It should be understood that various changes may be made in the function and arrangement of elements described in the exemplary preferred embodiment without departing from the spirit and scope of the invention as set forth in the appended claims.

What is claimed is:

1. An apparatus for controlling the position of a cursor on a display of a computer, comprising:

a first member;

a second member concentrically engaging said first member and coupled thereto for a first type of relative movement and a second type of relative movement;

a detector coupled to sense said first type of relative movement and said second type of relative movement between said first member and said second member and for generating first and second signals in response thereto;

wherein said first signal and said second signal are coupled to a computer for controlling the position of the cursor;

wherein the computer and the display are components of an onboard computer system deployed in an automobile having a steering column; and wherein the first member is mounted on said steering column.

2. An apparatus according to claim 1 wherein said relative movement of said first type is translational.

3. An apparatus according to claim 2 wherein said relative movement of said second type is rotational.

4. An apparatus according to claim 1 wherein said first member is substantially cylindrical and said second member is substantially cylindrical.

5. An apparatus according to claim 4 wherein said relative movement of said first type is translational and wherein said relative movement of said second type is rotational.

6. An apparatus according to claim 4 further comprising at least a first switch coupled to said second member which when activated instructs the computer to perform a first function.

7. An apparatus according to claim 6 further comprising a second switch coupled to said second member which when activated instructs the computer to perform a second function.

8. An apparatus according to claim 6 wherein said first function is related to the position of the cursor.

9. An apparatus for controlling the position of a cursor on a display of an onboard computer deployed in a vehicle having a steering assembly, comprising:

- a first member mechanically coupled to said steering assembly;
- a second member concentrically engaging said first member and coupled thereto for movement of a first type thereon and movement of a second type thereon;
- a detector coupled to sense relative movement of said first and second type between said first member and said second member and for generating first and second signals respectively corresponding thereto, said first and second signals being coupled to the computer for controlling the position of the cursor on the display; and
- at least a first switch coupled to said second member which, when activated, instructs the computer to perform a first function related to the position of the cursor.

10. An apparatus according to claim 9 wherein said first and second members are substantially cylindrical.

11. An apparatus according to claim 10 wherein said first relative movement is translational and said second relative movement is cylindrical.

12. An apparatus according to claim 11 further comprising

- at least a second switch coupled to said second member which, when activated, instructs the computer to perform a second function.

* * * * *